United States Patent
Gupta et al.

(10) Patent No.: US 9,294,907 B2
(45) Date of Patent: Mar. 22, 2016

(54) MOBILE CONNECTIVITY IN A COMMUNICATION NETWORK

(71) Applicant: Alcatel Lucent, Boulogne Billancourt (FR)

(72) Inventors: Anuj Gupta, Gurgaon (IN); Sushil Kumar Saini, Gurgaon (IN)

(73) Assignee: Alcatel Lucent, Boulogne-Billancourt (FR)

( * ) Notice: Subject to any disclaimer, the term of this patent is extended or adjusted under 35 U.S.C. 154(b) by 21 days.

(21) Appl. No.: 14/381,720

(22) PCT Filed: Feb. 14, 2013

(86) PCT No.: PCT/EP2013/052993
§ 371 (c)(1),
(2) Date: Aug. 28, 2014

(87) PCT Pub. No.: WO2013/127641
PCT Pub. Date: Sep. 6, 2013

(65) Prior Publication Data
US 2015/0031356 A1  Jan. 29, 2015

(30) Foreign Application Priority Data
Feb. 29, 2012  (EP) .................................... 12305245

(51) Int. Cl.
*H04W 8/06* (2009.01)
*H04W 8/02* (2009.01)
(Continued)

(52) U.S. Cl.
CPC .............. *H04W 8/06* (2013.01); *H04L 61/6054* (2013.01); *H04W 8/02* (2013.01); *H04W 8/12* (2013.01); *H04W 8/26* (2013.01); *H04W 60/00* (2013.01)

(58) Field of Classification Search
CPC ........... H04W 8/06; H04W 8/02; H04W 8/12; H04W 8/26; H04W 60/00; H04L 61/6054
See application file for complete search history.

(56) References Cited

U.S. PATENT DOCUMENTS

2003/0064723 A1  4/2003  Thakker
2005/0070278 A1  3/2005  Jiang
(Continued)

FOREIGN PATENT DOCUMENTS

DE  198 23 074 A1  11/1999
JP  2000-507422 A  6/2000
(Continued)

OTHER PUBLICATIONS

International Search Report for PCT/EP2013/052993 dated Mar. 11, 2013.

*Primary Examiner* — Daniel Washburn
*Assistant Examiner* — Eboni Hughes
(74) *Attorney, Agent, or Firm* — Fay Sharpe LLP

(57) ABSTRACT

According to an implementation of the present subject matter, systems and methods for providing mobile connectivity to users while roaming, on a dynamic basis are described. The method includes receiving a location update message associated with a user latched to a secondary service provider, the user having a subscriber identity module (SIM) with a primary International Mobile Subscriber Identity (IMSI) number provided by a default service provider of the user, wherein the location update message is based on the primary IMSI number of the user. The method also includes generating a dummy location update message based on the received location update message and a secondary IMSI number associated with the secondary service provider; and sending the dummy location update message to the secondary service provider associated with the secondary IMSI number such that the user is provided communication services by the secondary service provider based on the primary IMSI number.

10 Claims, 7 Drawing Sheets

(51) Int. Cl.
*H04L 29/12* (2006.01)
*H04W 8/12* (2009.01)
*H04W 8/26* (2009.01)
*H04W 60/00* (2009.01)

(56) References Cited

U.S. PATENT DOCUMENTS

2006/0276226 A1* 12/2006 Jiang .................. H04W 8/183
 455/558
2007/0213050 A1 9/2007 Jiang 2009/0215449 A1* 8/2009 Avner .................. H04W 8/06
 455/433
2010/0136967 A1* 6/2010 Du ..................... H04W 8/205
 455/432.5
2010/0184428 A1* 7/2010 Luo ..................... H04W 8/08
 455/433

FOREIGN PATENT DOCUMENTS

JP 2011-508998 A 3/2011
WO WO 99/62282 A1 12/1999

* cited by examiner

MOBILE CONNECTIVITY IN A COMMUNICATION NETWORK

FIELD OF INVENTION

The present subject matter relates to communication networks and, particularly, but not exclusively, to mobile connectivity in a communication network.

BACKGROUND

Communication devices, such as cellular phones, smart phones, personal digital assistants (PDAs), portable computers, and desktop computers, provide users with a variety of mobile communications services and computer networking capabilities. These communications services allow data to be exchanged between the service providers and the users. Mobile radio network operators currently operate not only on the prevalent mobile radio systems using the GSM standard for mobile communications, but also networks using the new and evolved Universal Mobile Telecommunications Service (UMTS) standard. Based on such standards and the infrastructure to support data exchange, the service providers provide connectivity to the users. Further, the users are charged for the communication services provided by the service provider or an operator, based on various parameters. Examples of such parameters can be location of a user who initiates a call, i.e., a caller party, location of a user to whom the call is directed, i.e., a called party, type of connection associated with the caller party, i.e., a pre-paid connection or a post paid connection, and the type of service requested by the user.

Typically, a user subscribes to the communication services provided by the service provider in a pre-defined geographic coverage area or circle, which is also referred to as a home network of the user. The subscription of the user for the communication services are with a fixed service operator which is the default service provider of the user. Generally, the user connects to the default service provider for the communication services. However, in certain situations, such as when the user is outside the home network, i.e., when the user is on "roaming", the user may connect to a service provider other than the default service provider. Further, in certain situations, the roaming may also be an international roaming where the user may travel through international boundaries and utilize the communication services through a service provider other than the default service provider. Generally, if a communication service is requested through the default service provider, the user is charged according to the normal tariffs. But, when the user is in roaming and connected to service providers other than the default service provider, incremented rates of providing services are charged in addition to the normal tariffs.

Further, to provide wireless connectivity, the default service provider issues a Subscriber Identity Module (SIM) to a user. The user utilizes the SIM along with a Mobile Equipment (ME) to connect to the communication network through a service provider. The SIM authorizes the user to connect with the service provider based on a unique International Mobile Subscriber Identity (IMSI) number and a unique Mobile Station International Subscriber Directory Number (MSISDN) which are allocated to the user by the default service provider. Therefore, based on the MSISDN and the IMSI number, a service provider identifies a user to be a native user, i.e., a user for whom the service provider is a default service provider or a user belonging to another service provider who is on roaming, i.e., a non-native user.

BRIEF DESCRIPTION OF THE FIGURES

The detailed description is described with reference to the accompanying figures. In the figures, the left-most digit(s) of a reference number identifies the figure in which the reference number first appears. The same numbers are used throughout the figures to reference like features and components. Some embodiments of system and/or methods in accordance with embodiments of the present subject matter are now described, by way of example only, and with reference to the accompanying figures, in which.

Figure 1:
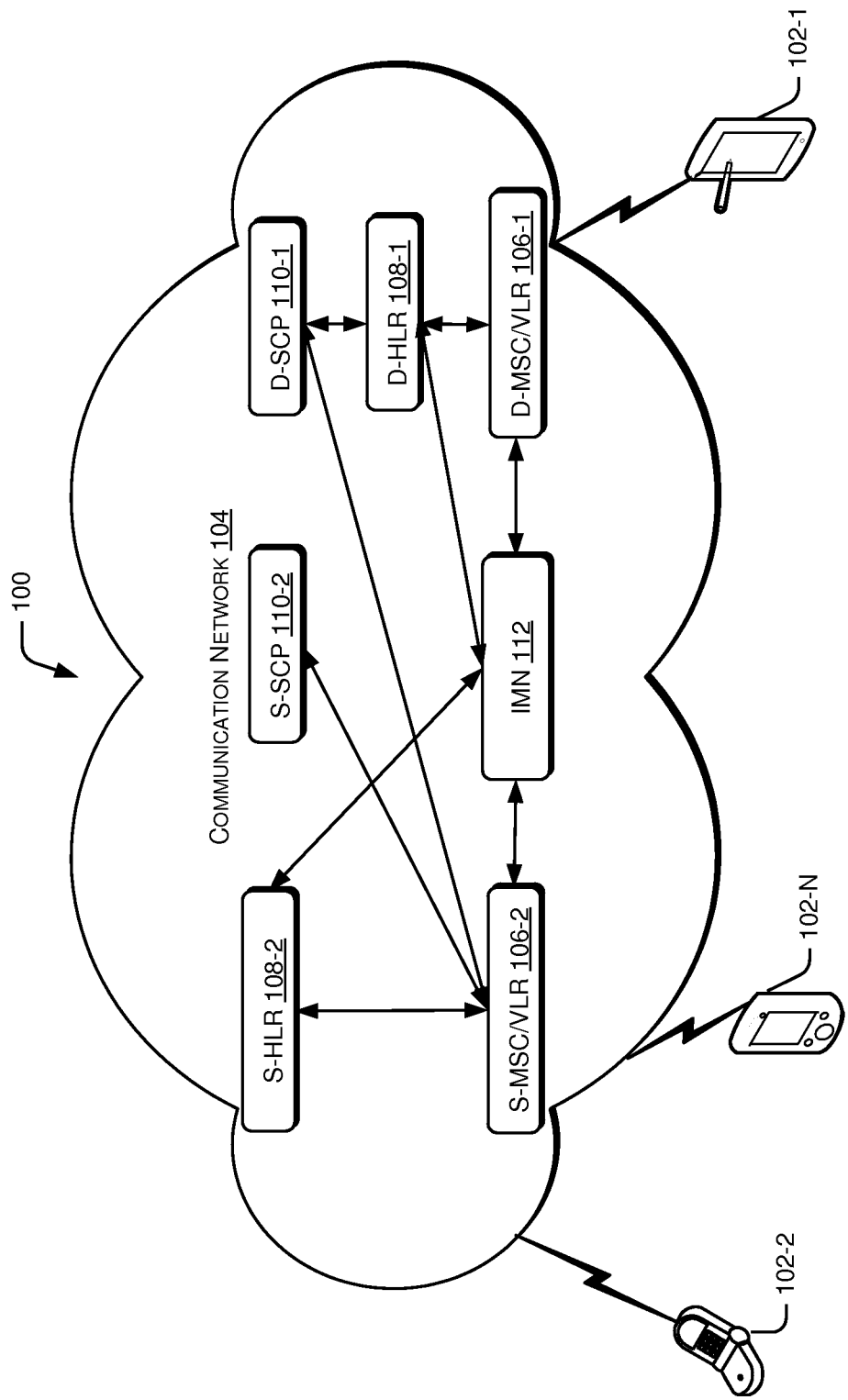
FIG. 1 illustrates an exemplary communication network environment, in accordance with an embodiment of the present subject matter.

It should be appreciated by those skilled in the art that any block diagrams herein represent conceptual views of illustrative systems embodying the principles of the present subject matter. Similarly, it will be appreciated that any flow charts, flow diagrams, state transition diagrams, pseudo code, and the like represent various processes which may be substantially represented in computer readable medium and so executed by a computer or processor, whether or not such computer or processor is explicitly shown.

SUMMARY

This summary is provided to introduce concepts related to mobile connectivity in a communication network. This summary is not intended to identify essential features of the claimed subject matter nor is it intended for use in determining or limiting the scope of the claimed subject matter.

In one implementation, a method to provide mobile connectivity in a communication network is described. The method may include receiving a location update message associated with a user latched to a secondary service provider, the user having a subscriber identity module (SIM) with a primary International Mobile Subscriber Identity (IMSI) number provided by a default service provider of the user, wherein the location update message is based on the primary IMSI number of the user. The method may further include generating a dummy location update message based on the received location update message and a secondary IMSI number associated with the secondary service provider, wherein the secondary IMSI number corresponds to the primary IMSI number of the use. Further, the method may include sending the dummy location update message to the secondary service provider associated with the secondary IMSI number such that the user is provided communication services by the secondary service provider based on the primary IMSI number.

In another implementation, a method is described where the method includes receiving a request for International Roaming (IR), from a user, wherein the request comprises at least a roaming nation and a secondary service provider. The method also includes allocating a secondary Mobile Station International Subscriber Directory Number (MSISDN) and a secondary International Mobile Subscriber Identity (IMSI) number, provided by the secondary service provider, from a pool of MSISDNs and IMSI numbers shared between the secondary service provider and a default service provider to the user, wherein the allocation enables the user to utilize the secondary MSISDN on IR.

In yet another implementation, a method may include receiving a location update message associated with a user, wherein the location update message is based on a primary International Mobile Subscriber Identity (IMSI) number. The method may also include identifying the user to be on International Roaming (IR) based on the primary IMSI number of a Subscriber Identity Module (SIM) corresponding to the user, wherein the SIM is provided by a default service provider of the user. Further, the method includes sending the location update message to an IMSI mapping node (IMN) based on the identification to provide user location details to the IMN.

In another implementation, an IMSI mapping node (IMN) is described. The IMN may include a processor and a memory, the memory coupled to the processor. The memory may include a request processing module configured to receive a location update message, associated with a user latched to a secondary service provider, the user having a SIM with a primary IMSI number provided by a default service provider of the user, wherein the location update message is based on the primary IMSI number of the user. Further, the memory may also include a configuration module configured to generate a dummy location update message based on the location update message and a secondary IMSI number associated with the secondary service provider, wherein the secondary IMSI number corresponds to the primary IMSI number of the user; and send the dummy location update message to a S-HLR of the secondary service provider associated with the secondary IMSI number such that the user is provided communication services by the secondary service provider based on the primary IMSI. The configuration module may further be configured to authenticate an agreement between the default service provider and the secondary service provider to generate the dummy location update message.

In one implementation, a network entity to provide mobile connectivity is described. The network entity may include a processor and a memory coupled to the processor. The memory may include a request processing module configured to receive a request for International Roaming (IR), from a user, wherein the request comprises at least a roaming nation and a secondary service provider. The memory may further include an allocation module configured to allocate a secondary MSISDN and a secondary IMSI number, provided by the secondary service provider, from a pool of MSISDNs and IMSI numbers shared between the secondary service provider and a default service provider to the user, wherein the allocation enables the user to utilize the secondary MSISDN on IR.

In another implementation, a computer-readable medium having embodied thereon a computer readable program code for executing a method is described. The method may include receiving a location update message, associated with a user latched to a secondary service provider, the user having a SIM with a primary IMSI number provided by a default service provider of the user, wherein the location update message is based on the primary IMSI number of the user. The method may further include generating a dummy location update message based on the received location update message and a secondary IMSI number associated with the secondary service provider, wherein the secondary IMSI number corresponds to the primary IMSI number of the user. Further, the method may include sending the dummy location update message to the secondary service provider associated with the secondary IMSI number such that the user is provided communication services by the secondary service provider based on the primary IMSI.

In one implementation, another computer-readable medium having embodied thereon a computer readable program code for executing a method is described. The method may include receiving a request for International Roaming (IR), from a user, wherein the request comprises of at least a roaming nation and a secondary service provider. The method may further include allocating a secondary MSISDN and a secondary International Mobile Subscriber Identity (IMSI) number, provided by the secondary service provider, from a pool of MSISDNs and IMSI numbers shared between the secondary service provider and a default service provider to the user, wherein the allocation enables the user to utilize the secondary MSISDN on IR.

DESCRIPTION OF EMBODIMENTS

According to an implementation of the present subject matter, systems and methods for providing mobile connectivity to users while roaming, on a dynamic basis are described. In one implementation, a subscribed user associated with its default service provider may be provided one or more additional Mobile Station International Subscriber Directory Number (MSISDN) for a Subscriber Identity Module (SIM) already provided by default service provider. The SIM may then be utilized by the user for connecting with communication network to avail communication services. The methods can be implemented in systems capable of exchanging data in accordance with the Global System for Mobile (GSM) techniques utilizing the different GSM communication standards, such as 2G, and 3G. Further, the methods may also be implemented in systems capable of exchanging data in accordance with the Code Division Multiple Access (CDMA) technique utilizing the different CDMA communication standards, such as IS 95 or cdmaOne, and CDMA 2000.

The techniques described herein may be used for various wireless communication systems, such as Code Division Multiple Access (CDMA), Time Division Multiple Access (TDMA), Frequency Division Multiple Access (FDMA), Orthogonal Frequency-Division Multiple Access (OFDMA), Single Carrier Frequency Division Multiple Access (SC-FDMA) and other systems. A CDMA system may implement a radio technology, such as Universal Terrestrial Radio Access (UTRA), cdma2000, etc. UTRA includes variants of CDMA. cdma2000 covers IS-2000, IS-95 and IS-856 standards. A TDMA system may implement a radio technology, such as Global System for Mobile Communications (GSM). An OFDMA system may implement a radio technology, such as Evolved UTRA (E-UTRA), Ultra Mobile Broadband (UMB), IEEE 802.20, IEEE 802.16 (WiMAX), 802.11 (WiFi™), Flash-OFDM®, etc. UTRA and E-UTRA are part of Universal Mobile Telecommunication System (UMTS). 3GPP Long Term Evolution (LTE) is an upcoming release of UMTS that uses E-UTRA. UTRA, E-UTRA, UMTS, LTE and GSM are described in documents from an organization "3rd Generation Partnership Project" (3GPP). cdma2000 and UMB are described in documents from an organization named "3rd Generation Partnership Project 2" (3GPP2). For clarity, certain aspects of the techniques are described below for WCDMA, and 3GPP terminology is used in much of the description below.

The systems and methods can be implemented in a variety of entities, such as communication devices, and computing systems. The entities that can implement the described method(s) include, but are not limited to, desktop computers, hand-held devices, laptops or other portable computers, tablet computers, mobile phones, PDAs, smartphones, and the like. Further, the method may also be implemented by devices capable of exchanging data to provide connectivity to different communicating devices and computing systems. Such devices may include, but are not limited to, Radio Network Controller (RNC), Base Transceiver Station (BTS), Mobile Switching Centre (MSC), Short Message Service Centre (SMSC), Base Station Subsystem (BSS), Home Location Register (HLR), Visitor Location Register (VLR), Authentication Center (AuC), data cards, mobile adapters, wireless (WiFi™) adapters, routers, and the like.

The increasing availability of network services and use of telecommunication devices, such as cell phones, Personal Digital Assistants (PDAs), and smart phones has increased workforce mobility. More and more number of users travel from one geographic location to the another. Such travels may generally be within the international boundaries of a nation; however certain users may also travel across nations crossing international boundaries. Even though the users are roaming in other nation outside their home network, they still expect to receive communication services either from their default service provider, or any other service provider to get connected with their associates around the globe.

In a competitive environment, due to advancements in the telecommunication technology and to meet ever increasing demands of the users, service providers provide the facility of national and international roaming to their users. International Roaming (IR) refers to a situation where the services of a service provider with whom a subscriber is registered with in a nation or region, i.e., default service provider, is made available to the subscriber in another nation or region. Similarly, National Roaming (NR) refers to a situation where the services of the default service provider within a region or home network, is made available to the subscriber in another region within the nation. However, to avail such NR and IR services, users generally have to pay roaming charges to the default service provider.

Generally, based on the MSISDN and the IMSI number provided to a user by the default service provider, any service provider identifies the user to either be a native user or a non-native user; and correspondingly, charges for the communication services utilized by the user are levied. In case the user is identified to be a native user, normal charges may be levied, however, in case the user is identified to be a non-native user, roaming charges may be levied. Such roaming charges may be significantly higher when the user is roaming internationally. Usually, this high charge in international roaming is levied on the user due to the fact that to provide any communication service to the user in a roaming nation, the service provider of the roaming nation has to connect to the default service provider of the user. Since this may result in increase of the route utilized to provide the communication service and may also utilize furthermore resources of both, the service provider of the roaming nation and the default service provider, high IR charges may be levied on a user utilizing IR.

To avoid payment of such high IR charges for utilization of communication services in a roaming nation, usually the user may purchase a subscription from a service provider in the roaming nation itself. The service provider of the roaming nation may provide a local SIM to the user with a specific International Mobile Subscriber Identity (IMSI) number and a local MSISDN. Through the local IMSI number and MSISDN, the user may utilize the communication services at the normal charges levied by the service provider of the roaming nation without any additional IR charges.

However, purchase of a local subscription in the roaming nation may provide a cumbersome and ineffective solution. Primarily, the purchase of a local subscription in the roaming nation may not be an easy procedure due to the verification documents and paper work involved during the process. Further, upon the purchase of the local subscription, the user is provided with a new SIM card with a new IMSI number and MSISDN which is to be replaced by the user in the Mobile Equipment (ME). Also, the user may have to provide the new MSISDN to his associates/community circle, which may be a cumbersome exercise. Sometime, users have personal data like contact list and messages in their original SIM which might be required to be copied in new SIM which may also be cumbersome. Furthermore, in situations where a user has to travel to multiple nations, purchase of a new subscription for every nation might be inconvenient and impractical.

Also, as an alternative, the user may utilize a multiple IMSI SIM while roaming to another nation. In a multiple IMSI SIM, a user may be provided with a SIM card including multiple IMSI numbers and corresponding MSISDNs. Each IMSI number and corresponding MSISDN may be dedicated for a particular nation such that the user may utilize the specific IMSI number and the MSISDN while roaming in corresponding nation and access the communication services at the charges levied by the service provider of that nation.

However, for the use of a multiple IMSI SIM card, the user may first have to get such multiple IMSI SIM card issued from his default service provider, and then may also have to replace the same in the ME. Also, such multiple IMSI SIM card may only be of use in the nations for which an associated IMSI number and a corresponding MSISDN exists and in infused. For other nations, the user may still either have to purchase a local subscription or may have to pay high IR charges. Further, since in a multiple IMSI SIM card, several IMSI numbers and corresponding MSISDNs are infused, this leads to wastage of resources as at any given instance, only one IMSI is in use. Furthermore, the use of a multiple IMSI SIM card might not be of much use for users who do not frequently travel to nations other than home nation.

According to an implementation of the present subject matter, systems and methods for providing mobile connectivity to users while roaming, on a dynamic basis are described. Although, the described methods and systems are described below with respect to IR, however, the systems and methods may be implemented in NR, albeit with a few variations, as will be understood by a person skilled in the art.

In one implementation, the user desiring to avail communication services in a roaming nation may be dynamically provided with a new MSISDN local to the roaming nation along with a corresponding IMSI number and, associated with the SIM already utilized by the user. Based on the new MSISDN and the new IMSI number, the user may utilize the communication services in the roaming nation without attracting the IR charges.

As described before, the systems and methods can be implemented in a variety of processing and communicating devices capable of communicating with a network according to the different standards defined for the communication. Although the description herein is explained with reference to a communicating device such as a mobile phone, the described method(s) may also be implemented in any other devices, as will be understood by those skilled in the art.

The systems and methods described herein may be implemented in a variety of communication networks employing various communication devices and/or computing system or devices. The communication network may include Global System for Mobile Communication (GSM) network, Universal Mobile Telecommunications System (UMTS) network, Long Term Evolution (LTE) network, Personal Communications Service (PCS) network, Time Division Multiple Access (TDMA) network, Code Division Multiple Access (CDMA) network, Next Generation Network (NGN), Public Switched Telephone Network (PSTN), and Integrated Services Digital Network (ISDN). Although the description herein is with reference to certain communication networks, the systems and methods may be implemented in other networks and devices, albeit with a few variations, as will be understood by a person skilled in the art.

The systems and methods as described herein, on one hand, provides a new MSISDN and a corresponding IMSI number that allows the user to utilize communication services in roaming nation without high IR charges, on the other, does not require the user to either change the SIM card and the corresponding MSISDN, or purchase a new subscription. For the sake of clarity, the service provider providing communication services to the user in the roaming nation is referred to as a secondary service provider hereinafter.

In general, the MSISDN and the IMSI number associated with a SIM are specific to a default service provider based on which communication services are provided to the user. The information related to each user and the associated SIM, is stored in the Home Location Register (HLR) of the service provider. The HLR of the default service provider, referred to as default HLR hereinafter, provides a Service Control Point (SCP) details associated with the user which authorizes the communication service based on different parameters, such as available balance, user block lists, and subscription to the service; during a location update procedure based on the IMSI of the user. Further, the default HLR associated with the user is also updated with real time location of the user through the location update procedure, along with other details related to the user.

Generally, while a user is outside his home network either on national roaming where the user travels within the international boundaries or on IR, to charge the user for the communication services availed by the user, the SCP associated with the default HLR is triggered. As described, the details of the SCP to be triggered for the billing purposes are received from the default HLR during the location update procedure based on the IMSI of the user.

In one implementation of the present subject matter, to provide communication services to the user in the roaming nation, an IMSI number local to the roaming nation and corresponding to the secondary service provider, referred to as secondary IMSI number hereinafter, is associated with the SIM card of the user. In other words, the SIM card of the user is dynamically associated with two IMSI numbers, one corresponding to the default service provider and the other to the secondary service provider. It would be understood that a secondary MSISDN is also associated with the secondary IMSI number. Further, the secondary IMSI number and the secondary MSISDN are not infused with the SIM provided to the user by the default service provider and may be allocated dynamically. It would be appreciated by those skilled in the art that the SIM card may also be dynamically associated with multiple IMSI number and MSISDNs in case the user wishes to travel to multiple roaming nations from his home nation.

In one implementation of the present subject matter, the user wishing to travel to another nation may send a request to the default service provider. The request may either be, sent through an Unstructured Supplementary Service Data (USSD) request from the ME of the user, provided by the user through voice call, or submitted in person by the user. In said implementation, the request may also provide the details of the nation to which the user desires to visit along with other details. For example, if a user is travelling to nation 'A' from nation 'B', the user may send a USSD request along with details of the nation 'A' to the default service provider.

Upon receiving the request from the user, a secondary IMSI number and a secondary MSISDN may be allocated to the user by the default service provider. The user may be provided with the secondary MSISDN by the default service provider while being not aware of the secondary IMSI number. As described above, the secondary IMSI number and the secondary MSISDN would correspond to the secondary service provider of the nation to which the user wishes to visit and utilize the communication services. In one implementation, the user may utilize the existing SIM card and, the allocated secondary IMSI number and the secondary MSISDN number may only be mapped to the IMSI and the MSISDN of the SIM card provided by the default service provider. It would also be appreciated by those skilled in the art that the IMSI number and MSISDN are specific to service provider and one service provider may not be authorized to provide IMSI number and MSISDN corresponding to any other service provider.

In one implementation of the present subject matter, to provide a secondary IMSI number and a secondary MSISDN corresponding to the secondary service provider, the default service provider may possess a pool of available IMSIs and MSISDNs belonging to the secondary service provider. It would be understood that the secondary IMSI number and the secondary MSISDN apart from the IMSI number and the MSISDN associated with the SIM (referred to as default IMSI and default MSISDN hereinafter) may be dynamically provided by the default service provider. Dynamic allocation of the secondary IMSI number and the secondary MSISDN may allow the service providers to utilize the IMSI number and MSISDN resource optimally.

For the default service provider to possess the pool of IMSIs and MSISDNs belonging to the secondary service provider, in one implementation of the present subject matter, the default service provider and the secondary service provider may have a mutual agreement. Such an agreement may be based on various business aspects to provide communication services to each other's subscribers, and their mutual understandings; and therefore, the details of such an agreement have been avoided for the sake of brevity.

It would also be understood by those skilled in the art that in the manner the default service provider possesses a pool of IMSI numbers and MSISDNs corresponding to the secondary service provider, the secondary service provider may also possess a pool of IMSI numbers and MSISDNs corresponding to the default service provider.

In one implementation, the communication services utilized by the user in the roaming nation may be provided through the secondary IMSI number and the secondary MSISDN, wherein the user may be utilizing the SIM card provided by the default service provider, i.e., the user may utilize the communication services in the roaming nation without changing the SIM card provided by the default service provider for use in home network. In said implementation, such facility is provided by mapping the primary IMSI number of the user to the allocated secondary IMSI number.

According to an implementation of the present subject matter, to map the primary IMSI number of the user to the secondary IMSI number of the user, an IMSI Mapping (IM) Node (IMN) may be implemented. The IMN may map the primary IMSI number to the secondary IMSI number. Further, the IMN may also map the primary MSISDN to the secondary MSISDN. For example, if a user utilizing a SIM card provided by the default service provider includes an IMSI number 'x'. This user may be allocated a secondary IMSI number 'y' to utilize communication services in the roaming nation. In such situation, the IMN would map the IMSI number 'x' to the IMSI number 'y' for the user to utilize communication services in the roaming nation without incurring high IR charges.

As described before, during the location update procedure, the default HLR of the user is contacted to receive the details regarding the user based on the IMSI number. As would be understood by those skilled in the art, to facilitate a location update procedure, the Mobile switching Center (MSC) or the Visiting Location Register (VLR) to which the user's ME is latched to, contacts the default HLR associated with the user based on Mobile GT (MGT) addresses where the MGT addresses are formed by using the IMSI number range of the service provider and Signalling Connection Control Part (SCCP) data. These MGT address are formed by using the IMSI range of the service provider. As IMSI are unique for a operator hence all the MGT range are prepared using the IMSI and directed to the default HLR dedicated for the IMSI using SCCP Global title configuration.

In one implementation of the present subject matter, the SCCP data in the MSC, VLR, HLR, Serving GPRS Support Node (SGSN), and Short Message Service Center (SMSC) of the secondary service provider may be modified for the users in IR utilizing a secondary IMSI number from the pool of IMSI numbers belonging to the secondary service provider and possessed by the default service provider.

In one implementation, based on the modification, the location update request initiated by the user may be directed to the IMN instead of the default HLR of the user by the VLR of the secondary service provider (referred to as secondary VLR hereinafter) connected with the user. In said implementation, the secondary VLR may send the location update message to the IMN with the IMSI number of the user as the primary IMSI number. The VLR may send the location update message to the IMN for only those IMSI numbers, for which the SCCP data has been modified.

Further in said implementation, the IMN, upon receiving the location update request from the secondary VLR may initiate an agreement authentication process for the user. In the agreement authentication process, the IMN may authenticate the agreement between the secondary service provider and the default service provider to share a pool of IMSI numbers and MSISDNs. In case the authentication is successful, the IMN may initiate a multiple-IMSI location update process.

In one implementation, during the multi-IMSI location update process, based on the primary IMSI number received from the secondary VLR, the IMN may determine the secondary IMSI number allocated to the user. Further, during the multi-IMSI location update process, the IMN may produce a dummy location update message similar to that of received from the secondary VLR. Although, the dummy location update message may be similar to the location update message received from the secondary VLR, the IMN may replace the primary IMSI number with the secondary IMSI number in the dummy location update message. In other words, the IMN may generate two location update messages, one original location update message with the primary IMSI number and the another dummy location update message with secondary IMSI number.

The IMN may further provide the original location update message with the primary IMSI number to the default HLR of the user, and the dummy location update message with the secondary IMSI number to the HLR of the secondary service provider (referred to as secondary HLR hereinafter). In said implementation, the dummy location update message may include the address of the IMN instead of the actual address of the VLR. Based on the location update messages sent by the IMN during the multi-IMSI location update process, the default service provider of the user is updated with the location of the user based on the primary IMSI number. Similarly, the secondary service provider is updated with the address of the IMN associated with the based on the secondary IMSI.

In response to the location update message received by the IMN, the default HLR and the secondary HLR may send an ISD message to the IMN. In one implementation, the IMN may ignore the ISD message received form the default HLR. Further, the IMN may forward the ISD message received from the secondary HLR to the VLR. In such a situation, the user would be able to utilize both, the primary MSISDN associated with the primary IMSI and the secondary MSISDN associated with the secondary IMSI. The user may utilize the secondary MSISDN for outgoing services, such as calls and messages however, the primary as well as the secondary MSISDN may be utilized for the purpose of incoming services.

The Mobile Terminating (MT) calls for the user, initiated based the primary MSISDN, would be routed through the default service provider based on the location information of the user present with the default HLR and, the MT calls for the user, initiated based the secondary MSISDN, would be routed through the secondary service provider based on the location information present with the IMN.

Further, in another implementation of the present subject matter, the modification in the SCCP data may also allow the secondary VLR to trigger either the SCP of the default service provider or of the secondary service provider for the Mobile Originating (MO) and MT calls associated with the user. This may allow the users to maintain either a single account for charging purposes with the default service provider, or dual accounts so that the charges for such services based on the local tariff provided by the secondary service provider are charged from a second account associated with the secondary service provider.

Therefore, the above mentioned systems and methods may allow users to utilize communication services in roaming nations without attracting high IR charges. Also, the user may not be required to change the SIM card or purchase a new multi-IMSI SIM card. Further, the user may be provided with free incoming calls in the roaming nation as the secondary IMSI number and the secondary MSISDN allows the SIM of the user to act as a local SIM and not attract high IR charges.

Although the description herein is with reference to GSM communication network, the systems and methods may be implemented in other networks and devices, albeit with a few variations, as will be understood by a person skilled in the art. The other communication networks may include Global System for Mobile Communication (GSM) network, Universal Mobile Telecommunications System (UMTS) network, Long Term Evolution (LTE) network, Personal Communications Service (PCS) network, Time Division Multiple Access (TDMA) network, Code Division Multiple Access (CDMA)

network, Next Generation Network (NGN), Public Switched Telephone Network (PSTN), and Integrated Services Digital Network (ISDN).

It should be noted that the description merely illustrates the principles of the present subject matter. It will thus be appreciated that those skilled in the art will be able to devise various arrangements that, although not explicitly described herein, embody the principles of the present subject matter and are included within its spirit and scope. Furthermore, all examples recited herein are principally intended expressly to be only for pedagogical purposes to aid the reader in understanding the principles of the invention and the concepts contributed by the inventor(s) to furthering the art, and are to be construed as being without limitation to such specifically recited examples and conditions. Moreover, all statements herein reciting principles, aspects, and embodiments of the invention, as well as specific examples thereof, are intended to encompass equivalents thereof.

The manner in which the systems and methods for providing mobile connectivity to users while roaming is implemented shall be explained in details with respect to the FIGS. 1-4. While aspects of described systems and methods for providing mobile connectivity to users can be implemented in any number of different computing systems, transmission environments, and/or configurations, the embodiments are described in the context of the following exemplary system(s).

It will also be appreciated by those skilled in the art that the words during, while, and when as used herein are not exact terms that mean an action takes place instantly upon an initiating action but that there may be some small but reasonable delay, such as a propagation delay, between the initial action and the reaction that is initiated by the initial action. Additionally, the word "connected" and "coupled" is used throughout for clarity of the description and can include either a direct connection or an indirect connection.

FIG. 1 illustrates a communication network environment 100 configured to provide mobile connectivity to users while in roaming, according to an embodiment of the present subject matter. The communication network environment 100 includes one or more communication devices 102-1, 102-2, . . . , and 102-N (collectively referred to as communication devices 102 and individually referred to as communication device 102 hereinafter) communicating with each other through a communication network 104. The communication devices 102 are User Equipments (UEs) used by user to communicate with each other. Further, the communication devices 102 may include a SIM which may be associated with a MSISDN and an IMSI number. Examples of the communication devices 102 may include, without limitation, desktop computers, hand-held devices, laptops or other portable computers, network computers, mobile phones, landline phones, and the like. Each of the communication devices 102 works on a communication protocol as defined by the communication network 104 to which the communication device 102 is coupled.

The communication network 104 may be a wireless or a wired network, or a combination thereof. The communication network 104 can be a collection of individual networks, interconnected with each other and functioning as a single large network (e.g., the internet or an intranet). Examples of such individual networks include, but are not limited to, Global System for Mobile Communication (GSM) network, Universal Mobile Telecommunications System (UMTS) network, Personal Communications Service (PCS) network, Time Division Multiple Access (TDMA) network, Code Division Multiple Access (CDMA) network, Next Generation Network (NGN), Public Switched Telephone Network (PSTN), and Integrated Services Digital Network (ISDN). Depending on the technology, the communication network 104 includes various network entities, such as gateways, routers; however, such details have been omitted for ease of understanding.

The description is explained with reference to the communication devices 102-1 and 102-2 however, the same can be extended to other communication devices as well. For the sake of explanation, the communication device 102-1 may be considered to be connected to a service provider which it may be registered with, i.e., the default service provider of the communication device 102-1. Further, due to various reasons, such as being located in a non-home network and roaming in another nation, the communication device 102-2, may be connected to a service provider which may not be a default service provider of the communication device 102-2. As apparent, the service provider with which the communication device 102-2 is connected is a secondary service provider for the communication device 102-2. For the ease of explanation, the default service provider of the communication device 102-2 is considered to be service provider to which the communication device 102-1 is connected to, i.e., the communication devices 102-1 and 102-2 both are registered with the same service provider while communication device 102-1 is its home network and the communication device 102-2 is roaming.

The communication network 104 may comprise more than one service providers. For the ease of explanation, considered herein are two service providers, namely, the default service provider which in the above example, is the default service provider of the communication device 102-1 and the communication device 102-2 and a secondary service provider which is a secondary service provider for the communication device 102-1. Further, the default service provider and the secondary service provider to the communication device 102-1 may be located in different nations where the secondary service provider may provide IR to the communication device 102-1.

In order to communicate with each other, each of the communication devices 102-1 and 102-2 connects to the nearest base transceiver stations (not shown in the figure), which provide radio coverage within a cell. Multiple base transceiver stations connect to a base station controller (not shown in the figure), which provides local switching to effect handover between the base stations. The base station controller is further connected to a mobile switching center (MSC), which is responsible for providing communication services to subscribers, i.e., user of communication device 102-1, and user of communication device 102-2.

In one implementation of the present subject matter, the communication device 102-1, which may be in its home network and is be connected to a Default-Mobile Switching Center (D-MSC)/VLR 106-1, through its own base station controller and other network entities (not shown) may transfer data and avail communication services, such as voice calls and messages. Similarly, there may exist another service provider, the secondary service provider, to which the communication device 102-2 may be connected through a Secondary-Mobile Switching Center (S-MSC)/VLR 106-2.

Further, the D-MSC/VLR 106-1 and the S-MSC/VLR 106-2 may be associated with a corresponding Home location register (HLR), such as a Default HLR (D-HLR) 108-1 and a Secondary HLR (S-HLR) 108-2, hereinafter collectively referred to as HLRs 108. It would be understood that typically, each of the HLRs 108 stores information associated with each user registered with the service provider. The information may include, but is not limited to, address of an MSC/VLR that covers the subscriber's CAMEL subscription information containing the home SCP address reference and service triggers, subscriber's home location, the address of an MSC where the subscriber is currently located, etc. The HLR 108 also stores information, such as the IMSI number associated with the SIM of each subscriber, and MSISDN number of the subscriber. It would be appreciated by a person skilled in the art that the D-MSC/VLR 106-1 and D-HLR 108-1 may be implemented as separate entities or can be implemented within a single unit. Similarly, the S-MSC/VLR 106-2 and the S-HLR 108-2 may be implemented as separate entities or can be implemented within a single unit.

The default service provider and the secondary service provider may also implement Service Control Points (SCPs), such as a Default SCP (D-SCP) 110-1, and a Secondary SCP (S-SCP) 110-2, commonly referred to as SCP 110 hereinafter. It would be understood that each service provider implements at least one SCP, which holds the account and service subscription information of the subscribers of the service provider. The account information may include information related to the user account, such as the available balance of a subscriber, the block lists of the subscriber, the tariff plan selected by the subscriber, and the subscriptions adopted by the subscriber. During any usage of a communication service provided by the default service provider, the D-SCP 110-1 may be contacted by the D-MSC/VLR 106-1 for authentication based on the account information, such as the available balance. Further, the D-SCP 110-1 may also charge the user, such as the user utilizing the communication device 102-1 based on the stored tariff plan. It would be further understood that the details of the SCP associated with each subscriber is available with the default HLR of the user. Therefore, the details of the D-SCP 110-1, associated with the communication device 102-1 and 102-2 may be stored in the D-HLR 108-1, maintained by the default service provider.

Similarly, the secondary service provider may also implement and maintain at least one SCP, such as the S-SCP 110-2, to store user account information, and authenticate the communication services utilized by the users registered with the secondary service provider. In one implementation, in order to connect the two MSC/VLRs 106-1 and 106-2, the communication network 104 may also include a gateway MSC (G-MSC) (not shown), which may act as a node to interconnect the two MSCs 106-1 and 106-2. It will be understood that G-MSC may be a separate entity or functionalities of the G-MSC may be integrated with the functionalities of the D-MSC/VLR 106-1 or the S-MSC/VLR 106-2. For the sake of explanation and simplicity, in said implementation, the G-MSC is integrated with the D-MSC/VLR 106-1 and the S-MSC/VLR 106-2.

The communication network 104 may further implement an IMSI Mapping Node (IMN), such as an IMN 112. The IMN 112 may be a network entity configured to communicate between the entities of different service providers, such as the default service provider and the secondary service provider. The IMN 112 may include the information about the inter service provider agreements and details related to pool of shared MSISDN and IMSI among the service providers. The IMN 112 may also include the mapping between the primary and secondary IMSI number associated with a user. In one implementation, the IMN 112 may communicate between the HLRs 108 and the S-MSC/VLR 106-2. The IMN 112, based on the inter service provider agreements and mapping between the primary and secondary IMSI number associated with a user, enable utilization of IR at local tariff for a user.

In one implementation, while roaming in another nation and utilizing the IR, the user may utilize two MSISDNs. One MSISDN may be associated with the default service provider (primary MSISDN) while the other may be associated with the secondary service provider (secondary MSISDN). Further, a secondary IMSI number may also be associated with the secondary MSISDN utilized by the user. The IMN 112 may include the mapping between the primary MSISDN and primary IMSI number with the secondary MSISDN and secondary IMSI number. Such mapping in the IMN 112 may enable routing of calls and messages to the secondary MSISDN of the user who is utilizing a SIM embedded with the primary IMSI number.

In operation, the IMN 112 may provide the location details of the user to both, the default service provider and the secondary service provider with different IMSI numbers. The default service provider may be provided with the location details of the user along with the primary IMSI number, while the secondary service provider may be provided with the location details of the user along with the secondary IMSI number. The dual update of the location details with different IMSI number may allow the default service provider to route MT calls for the user on the primary MSISDN and may also the secondary service provider to route MT calls for the user on the secondary MSISDN. Thus, the implementation of the IMN 112 in the communication environment 100 may enable usage of multiple MSISDNs by a user without changing the SIM or utilizing a multi-IMSI SIM. For the sake of better understanding, the details of the IMN 112 implementation are further explained in greater detail with reference of FIG. 2.

Figure 2:
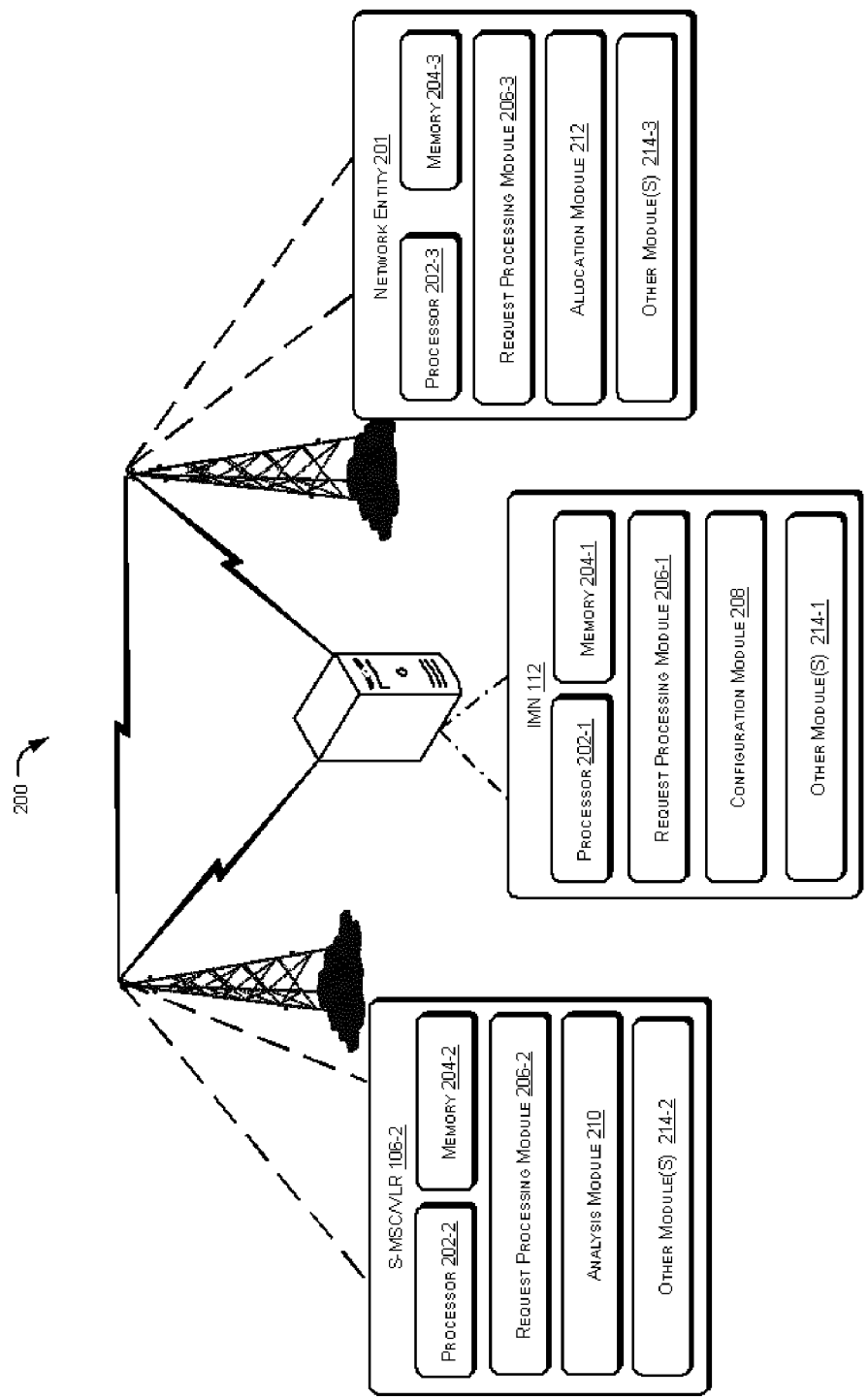
FIG. 2 schematically illustrates network entities for providing mobile connectivity in a communication network, in accordance with an embodiment of the present subject matter.

FIG. 2 illustrates the components of a network entity 201, the S-MSC/VLR 106-2, and the IMN 112, according to an embodiment of the present subject matter. In accordance with the present subject matter, the network entity 201, the S-MSC/VLR 106-2, and the IMN 112 are communicatively coupled to each other through the various components of the communication network 104 (as shown in FIG. 1).

In one implementation, the network entity 201 may be implemented by the default service provider of a user to provide secondary MSISDN and secondary IMSI number to the user for IR. The network entity 201 may be implemented as any entity of the default service provider, such as by entities capable of exchanging data to provide connectivity to different communicating devices and computing systems. Such entities may include, but are not limited to, Radio Network Controller (RNC), Base Transceiver Station (BTS), Mobile Switching Centre (MSC), Short Message Service Centre (SMSC), Base Station Subsystem (BSS), Home Location Register (HLR), Visitor Location Register (VLR), and Authentication Center (AuC).

The IMN 112, S-MSC/VLR 106-2, and the network entity 201 may include processors 202-1, 202-2, and 202-3 collectively referred to as processor 202 hereinafter. The processor 202 may be implemented as one or more microprocessors, microcomputers, microcontrollers, digital signal processors, central processing units, state machines, logic circuitries, and/or any devices that manipulate signals based on operational instructions. Among other capabilities, the processor(s) is configured to fetch and execute computer-readable instructions stored in the memory.

The functions of the various elements shown in the figure, including any functional blocks labeled as "processor(s)", may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" should not be construed to refer exclusively to hardware capable of executing software, and may implicitly include, without limitation, digital signal processor (DSP) hardware, network processor, application specific integrated circuit (ASIC), field programmable gate array (FPGA), read only memory (ROM) for storing software, random access memory (RAM), non-volatile storage. Other hardware, conventional and/or custom, may also be included.

The IMN 112, S-MSC/VLR 106-2, and the network entity 201 may further include one or more memory components, referred to as memory 204-1, 204-2 and 204-3, respectively. The memory 204-1, 204-2 and 204-3 are collectively referred to as memories 204 hereinafter. The memories 204 may include any computer-readable medium known in the art including, for example, volatile memory, such as static random access memory (SRAM) and dynamic random access memory (DRAM), and/or non-volatile memory, such as read only memory (ROM), erasable programmable ROM, flash memories, hard disks, optical disks, and magnetic tapes. The memories may also be computer readable medium that may include any computer-readable medium known in the art including, for example, volatile memory, such as random access memory (RAM) and/or non-volatile memory, such as flash.

The IMN 112, S-MSC/VLR 106-2, and the network entity 201 among other things may also include different modules that include routines, programs, objects, components, data structures, and the like, which perform particular tasks or implement particular abstract data types. The modules may supplement applications on the IMN 112, S-MSC/VLR 106-2, and the network entity 201, for example, modules of an operating system. Although the modules have been shown to be separate from the memory components, it would be understood that the modules may also be implemented in the memories 204. In one implementation, the IMN 112, S-MSC/VLR 106-2, and the network entity 201 may further include data (not shown) that serves, amongst other things, as a repository for storing data that may be fetched, processed, received, or generated by one or more of the modules.

In one implementation, the IMN 112, S-MSC/VLR 106-2, and the network entity 201 may include request processing module 206-1, 206-2, and 206-3, respectively. For the sake of simplicity, the request processing module 206-1, 206-2, and 206-3 are collectively referred to as request processing modules 206 hereinafter. Further, the IMN 112 may include a configuration module 208, the S-MSC/VLR 106-2 may include an analysis module 210, and the network entity 201 may include an allocation module 212 apart from the request processing module 206-1, 206-2, and 206-3. The IMN 112, S-MSC/VLR 106-2, and the network entity 201 may also include other modules 214-1, 214-2, and 214-3, collectively referred to as other modules 214. The other module 214 may include programs or coded instructions that supplement applications and functions, for example, programs in the operating system of the IMN 112, S-MSC/VLR 106-2, and the network entity 201.

The S-MSC/VLR 106-2 may be implemented by the secondary service provider of the user. The IMN 112 may either be implemented by the default service provider or the secondary service provider. In another implementation, the IMN 112 may be implemented by an independent service provider, other than the default service provider and the secondary service provider. Although the IMN 112 is shown to be an independent network entity, however, it would be appreciated by those skilled in the art that the IMN 112 may also be implemented with an entity of the default or secondary service provider as a single unit.

In one implementation of the present subject matter, a user utilizing communication services in his home network may wish to travel to another nation and utilize the same communication services. Such a user may send a request to his default service provider to provide IR services. For example, the user may send an Unstructured Supplementary Service Data (USSD) message, a Short Service Message (SMS), or a Wireless Application Protocol (WAP) push message to the default service provider. The message may include the details regarding the IR, such as the roaming nation's international code, the duration of stay, and a preferred service provider in the roaming nation. In another implementation, the user may send the request through an Interactive Voice Response (IVR) system, customer care, or web application. Further, in yet another implementation of the present subject matter, the user may submit the request in person with to the default service provider. It would be appreciated by those skilled in the art that the message or request may be sent by the user while being in the home network or after arriving in the roaming nation.

In another implementation of the present subject matter, the user may automatically be provided with a secondary MSISDN and associated with a corresponding secondary IMSI number. The same may be provided to the user as soon as the user arrives in the roaming nation and latches onto the communication network of the roaming nation.

The request of the user may be processed by the default service provider. In one implementation, the request processing module 206-3 of the network entity 201 may process such requests. The request processing module 206-3 may determine the nation for which the user has requested the IR services for based on the received request. The determination of the nation may allow the request processing module 206-3 to identify an existence of an agreement with a service provider in that nation. That is, whether the default service provider would be able to provide a secondary MSISDN and an associated secondary IMSI number to the user to utilize IR services in the requested nation.

As described before, the default service provider may have an agreement with different service providers of other nations to provide secondary MSISDNs and secondary IMSI numbers to their users. Based on the agreement, the service providers, default and the secondary, may exchange a pool of MSISDNs and IMSI numbers for the use of one another. That is, based on the agreement, the secondary service provider may provide a pool of MSISDNs and IMSI numbers associated with the secondary service provider to the default service provider. Similarly, the default service provider may also provide a pool of MSISDNs and IMSI numbers associated with the default service provider to the secondary service provider.

It would be appreciated that the default service provider may have an agreement with multiple service providers where such service providers may be located in different nations. Further, the default service provider may also have agreements with multiple service providers within a nation.

In one implementation, the allocation module 212 of the network entity 201 may be configured to allocate a secondary MSISDN and an associated IMSI number to the user from the pool of shared MSISDN and IMSI numbers. It would be understood that from among multiple pools corresponding to different service providers available with the default service provider, the allocation module 212 may determine a particular pool based on the details provided by the user in the request. For example, the default service provider may first shortlist the pool by the nation in which the user may be traveling and then may select the pool of the service provider the user has requested for. Further, in case the default service provider does not have an agreement with any service provider in the nation requested by the user, the allocation module 212 may send the user a failure notification.

It would be understood that in case the user has not specified any preference of a service provider along with the nation, the allocation module 212 may randomly select a service provider and allocate the MSISDN and the IMSI number from the pool shared by the selected service provider.

In another implementation, the allocation module 212 may intimate the user of the allocated secondary MSISDN corresponding to the selected service provider (secondary service provider). Although a secondary IMSI number associated with the allocated secondary MSISDN is also allocated, however the same may not be provided to the user. The allocation module 212, upon allocation of the secondary MSISDN and the secondary IMSI number, may also intimate the same to the secondary service provider. In one implementation, the allocated secondary MSISDN may be provided to the S-MSC/VLR 106-2 of the secondary service provider. Further, the allocation module 212 may also send the allocated secondary MSISDN and the secondary IMSI number along with the primary MSISDN and the primary IMSI number to the IMN 112.

The configuration module 208 of the IMN 112 may be configured to map the primary MSISDN and the primary IMSI number of the user to the allocated secondary MSISDN and the secondary IMSI number provided by the allocation module 212. In one implementation, the IMN 112 may verify the agreement between the default service provider and the secondary service provider before mapping the different MSISDNs and IMSI numbers.

A person skilled in the art would appreciate that when a communication device enters a cell of a communication network, the communication device is authenticated and sends location update message to the MSC/VLR to which it is latched to. The authentication and location update message may include the details of the SIM utilized by the communication device, such as the IMSI number. Further, the location update message, apart from other parameters, also includes the details of the latched MSC, VLR, and BTS. Further, such details are provided to the default HLR of the communication device based on the IMSI number in the location update message. In situations where a user is roaming is in a non-home network and latched to a secondary service provider, the MSC/VLR of the secondary service provider may provide the location update message of the default HLR associated with the user based on the IMSI number.

In one implementation of the present subject matter, the MSC/VLR of the secondary service provider, such as the S-MSC/VLR 106-2 may be configured to send an authentication message to the IMN 112. The authentication message may be sent to authenticate the user based on subscription with its default service provider. In said implementation, the request processing module 206-2 may receive the authentication message and forward it to the default HLR of the user, such as the D-HLR 108-1. In said implementation, upon authentication, the D-HLR 108-1 may send a confirmation of a successful authentication to the IMN 112 where the confirmation may then be forwarded by the request processing module 206-2 to the S-MSC/VLR 106-2.

In another implementation, the MSC/VLR of the secondary service provider, such as the S-MSC/VLR 106-2 may be configured to provide the location update message of the user utilizing the IR, to the IMN 112 instead of the default HLR 108-1 of the user. In other words, based on the primary IMSI of the user, the S-MSC/VLR 106-2 may send the location update message of the user to the IMN 112 instead of the default HLR, such as the D-HLR 108-1 of the default service provider. In said implementation, the request processing module 206-2 of the S-MSC/VLR 106-2 may receive the location update message from different users in the cell. Further, the analysis module 210 may identify the location update message to be from a user on IR based on the mapped MSISDN and IMSI number received from the allocation module 212. Similarly, the analysis module 210, based on the mapping of the MSISDN and IMSI numbers may also send the location update message to the default HLR of the user. This may occur in situations where either the user latched onto to the MSC/VLR 106-2 is in its home network, i.e., is a subscriber of the secondary service provider, or the user is utilizing IR and has not been allocated a secondary MSISDN and secondary IMSI number.

As described, for the user with an allocated secondary MSISDN and secondary IMSI number, the location update message is forwarded by the request processing module 206-2 to the IMN 112. In one implementation, the configuration module 208 of the IMN 112 is configured to create a dummy location update message based on the received original location update message. The configuration module 208, in said implementation, may configure the dummy location update message in a manner such that the dummy location update message appears to have been generated from a communication device with a SIM consisting of the secondary IMSI number. To this end, the configuration module 208 may be configured to copy the details of the original location update message to generate the dummy location update message.

In another implementation, the configuration module 208 may substitute the secondary IMSI number in place of the primary IMSI number in the dummy location update message. Further, the configuration update message may also substitute the address of the IMN 112 in place of the MSC and VLR address. Upon substitutions performed by the configuration module 208, the IMN 112 may include two location update messages, the original location update message, and the dummy location update message.

The configuration module 208 of the IMN 112 may send the original location update message to the default HLR of the user implemented by the default service provider. Further, the configuration module 208 may send the dummy location update message to a HLR of the secondary service provider, such as the S-HLR 108-2. In other words, the configuration module 208 may send two different location update messages, one to the default HLR associated with the user, and another to the secondary HLR of the secondary service provider.

In another implementation, the request processing module 206-1 may also be configured to process the response of the sent location update messages. It would be understood that the response would be received by the IMN 112 since the location update message was sent by the IMN 112. In said implementation, the response sent by the default HLR 108-1 and the HLR 108-2 of the secondary service provider may be intercepted by the IMN 112. The request processing module 206-1 may intercept the response from the default service provider and may not forward the same to the MSC/VLR to which the user is latched to, such as the S-MSC/VLR 106-2. In such scenario, the acknowledgement of the response and other messages related to the location update message sent to the D-HLR 108-1 may be exchanged between the IMN 112 and entities of the default service provider.

Further, the request processing module 206-1 may forward the response from the secondary HLR to the MSC/VLR to which the user is latched to, such as the S-MSC/VLR 106-2. For example, the secondary HLR may send an ISD message which includes the secondary IMSI number and the secondary MSISDN allocated to the user. The request processing module 206-1 may provide this ISD message to the S-MSC/VLR 108-2 to enable it to be updated with the secondary profile of the user. The updation of the secondary profile of the user with the S-MSC/VLR 108-2 may allow the mapping of the primary IMSI number of the user with the secondary profile of the user, such as the secondary MSISDN. In such a scenario, the IMN 112 may act as a bridge between the S-MSC/VLR 108-2 and the secondary HLR to facilitate communication between the two entities for updation of the user secondary profile and mapping of the primary IMSI number of the user with the secondary MSISDN in the S-MSC/VLR 108-2.

In one implementation, the communication services utilized by the user in the roaming nation, such as MO calls and MO Short Message Service (SMS), would be received by the MSC/VLR to which the user is latched to, such as the S-MSC/VLR 108-2. In such scenarios, the request processing module 206-2 of the S-MSC/VLR 108-2 may initiate the communication service request of the user based on the primary IMSI number also associated with the user. This may allow the user to utilize the communication services while roaming at local charges. Further, the communication services requested by the user may be provided by the secondary service provider based on techniques known in the art where the user is considered to be in Home Public Land Mobile Network (HPLMN).

While utilizing communication services in the roaming nation, the user may receive calls and SMSs. Generally, such calls and SMSs are referred to as MT calls and MT SMSs. Since the user would be utilizing two MSISDNs, any such MT calls and MT SMSs may be terminated at any one of the MSISDNs. MT calls and MT SMSs at the primary MSISDN may directly be routed through the default service provider to the user since the default HLR holds the current location of the user along with the serving MSC/VLR, such as the S-MSC/VLR 106-2.

However, in case there are MT calls and MT SMSs for the user at the secondary MSISDN, the user may not be contacted directly since the S-HLR 108-2 associated with the user and his secondary MSISDN and secondary IMSI number does not include the details of the actual S-MSC/VLR 106-2 to which the user is latched to. Rather, the S-HLR 108-2 includes the address of the IMN 112. Hence, in one implementation of the present subject matter, any MT call and MT SMS for the user on the secondary MSISDN may be forwarded by the secondary HLR associated with the user to the IMN 112. It would be appreciated by those skilled in the art that the MT call/SMS to any user are connected by the gateway of the service provider to which the user's MSISDN belongs. Since the procedure is well known in the art, the details of the same have been omitted for the sake of brevity.

In another implementation of the present subject matter, the IMN 112 may modify the MT call/SMS parameters and forward the request to the MSC/VLR to which the user is latched to, such as the S-MSC/VLR 106-2. In said implementation, the configuration module 208 may be configured to modify the IMSI number of the MT calls/SMSs. Since the MT call/SMS is for the user on the secondary MSISDN, the request received by the IMN 112 would include the secondary IMSI number associated with the secondary MSISDN. The configuration module 208 may identify the primary IMSI number associated with the secondary IMSI number and replace the secondary IMSI number with the identified primary IMSI number to generate a modified MT call/SMS request.

Further, the request processing module 206-1 of the IMN 112 may forward the modified MT call/SMS request to the MSC/VLR to which the user is latched to, such as the S-MSC/VLR 106-2. Since the request may contain the primary IMSI number, the S-MSC/VLR 106-2 may directly establish the connection with the communication device of the user utilizing the SIM embedded with the primary IMSI number. In another implementation, the manner in which the MT call/SMS request from the secondary HLR for the user is modified, the configuration module 208 of the IMN 112 may also modify the responses received from the S-MSC/VLR 106-2 in the same manner. It would be appreciated that in such a scenario, the modification may be performed by modifying the primary IMSI number by the secondary IMSI number.

During the signalling procedure to establish a connection with the user, different entities involved may follow the CAMEL call flow in the same manner as known in the art. And therefore, the details of the same have been omitted for the sake of brevity.

In yet another implementation of the present subject matter, the user utilizing communication services in a roaming nation may also utilize Global Packet Radio Service (GPRS). The user may make use of the secondary MSISDN to utilize the communication services provided by GPRS in the roaming nation at local charges. In said implementation, the IMN 112 may act as the IMSI number mapping node to facilitate mobile connectivity for the user with two MSISDNs and two IMSI numbers. As would be understood by those skilled in the art that a GPRS location update message, similar to the previously described location update message is utilized to update the D-HLR 108-1 of a user with number and address of a Serving GPRS Support Node (SGSN) serving the user.

In one implementation, similar to the modification of the location update message, the IMN 112 may also modify the GPRS location update message. The configuration module 208 may generate a dummy GPRS location update message by substituting the primary IMSI number with the secondary IMSI number. Further, the configuration module 108 may also replace the number and address of the SGSN in the dummy GPRS location update message to the address of the IMN 112. Similar to the previously described procedure for location update messages, the request processing module 208 may send the originally received GPRS location update message to the D-HLR 108-1 of the user. Further, the request processing module 206-1 may send the dummy GPRS location update message to the S-HLR 108-2.

Upon sending different GPRS location update messages to different HLRs, the communication services based on GPRS may be provided to the user in a similar manner as explained for the MO/MT calls and MO/MT SMSs. The IMN 112 may map the primary and secondary IMSI to provide mobile connectivity to the user to both, the primary MSISDN, and the secondary MSISDN.

Based on the mapping between the primary IMSI number and primary MSISDN with the secondary IMSI number and the secondary MSISDN, the IMN 112 may implement several different applications, such as applications running though USSD interface, and GPRS applications. The IMN 112 may be configured to either contact the D-HLR 108-1 of the user, or the S-HLR 108-2 of the user in order to support USSD application provided. Further, the IMN 112 may also support supplementary services, such as call forwarding, call waiting, and call barring.

Figure 3A:
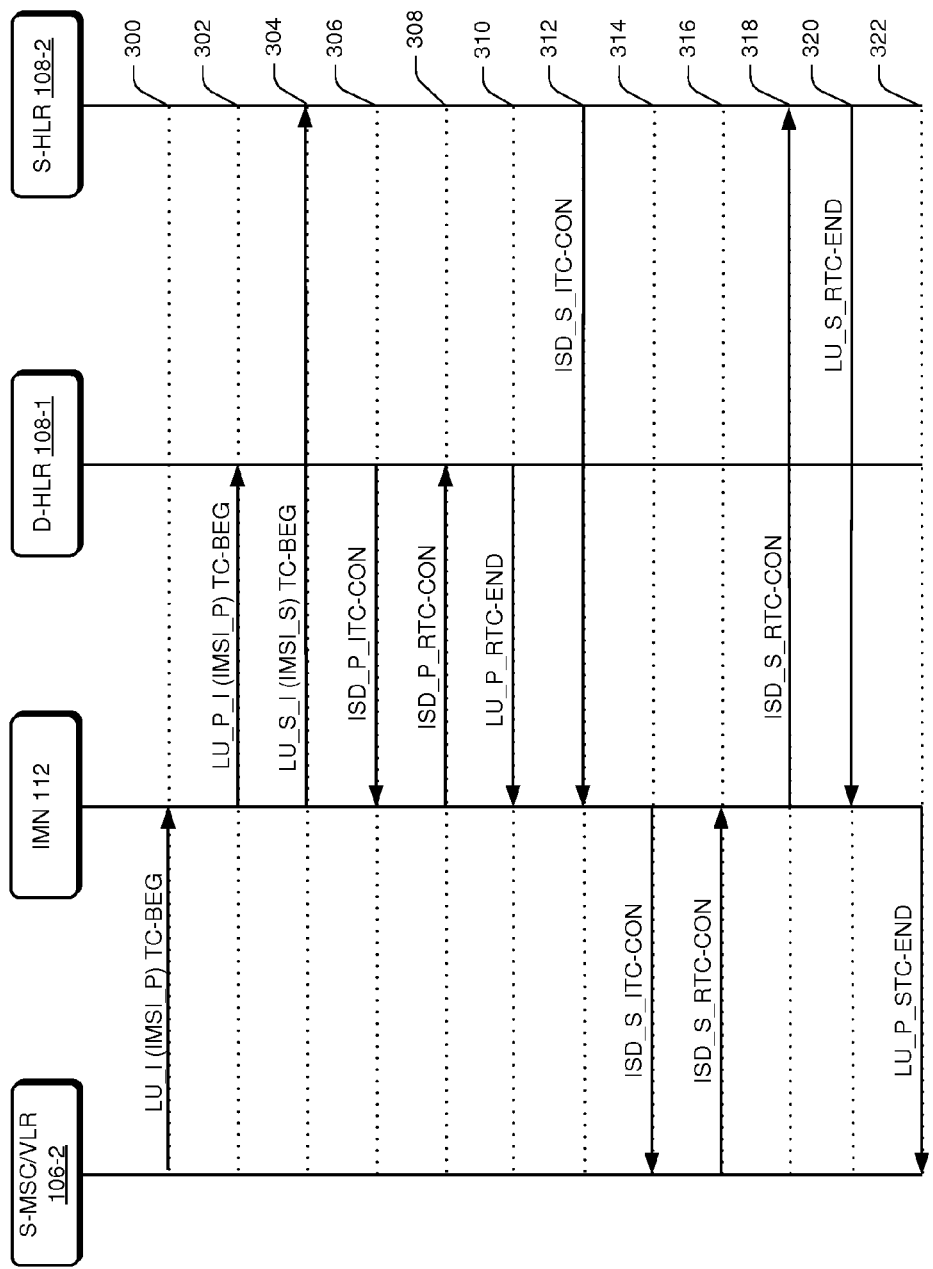
FIGS. 3(a), 3(b), and 3(c) represent call flow diagrams indicating procedures of providing mobile connectivity in a communication network, in accordance with an embodiment of the present subject matter.
Figure 3B:
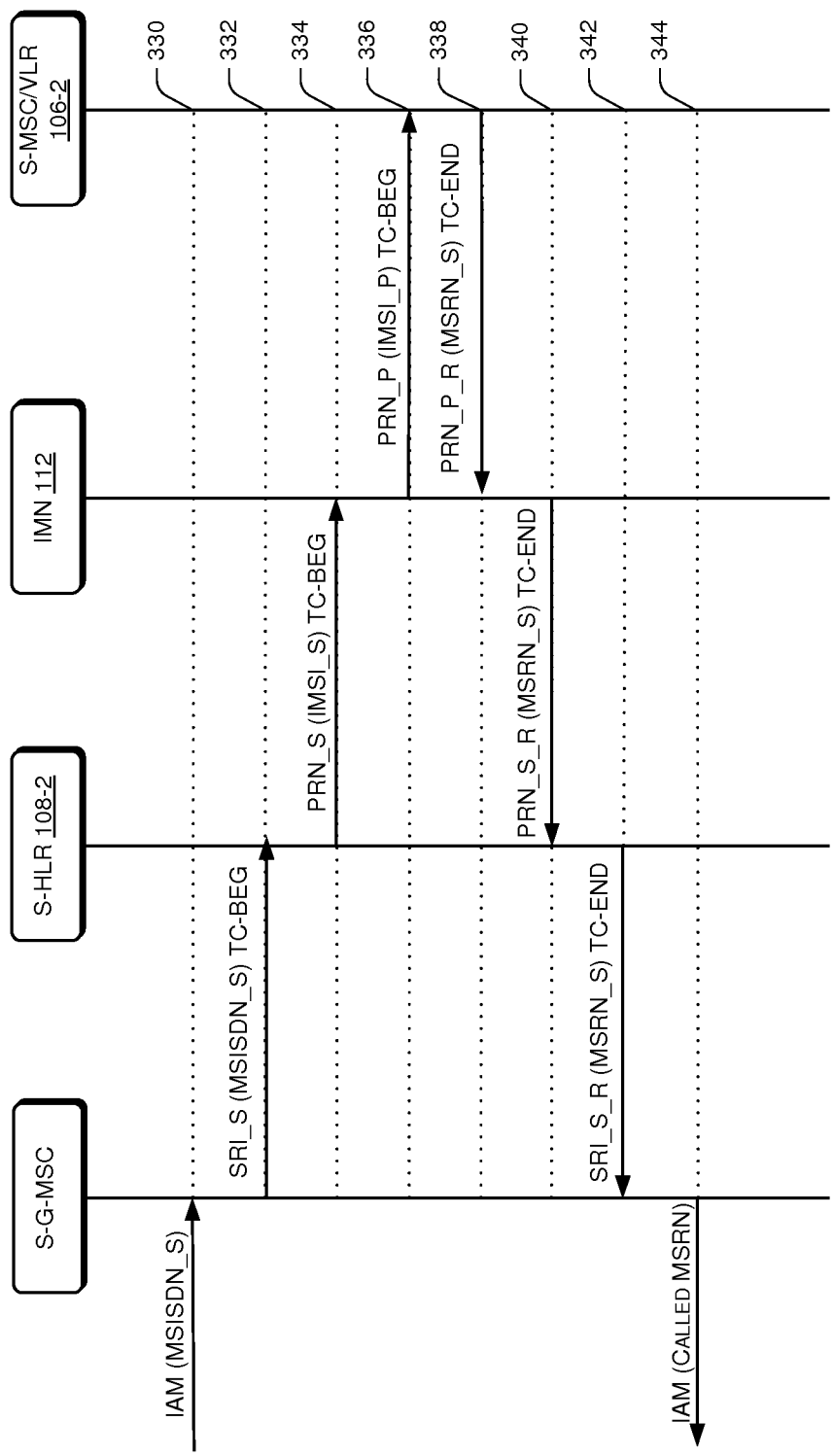
Figure 3C:
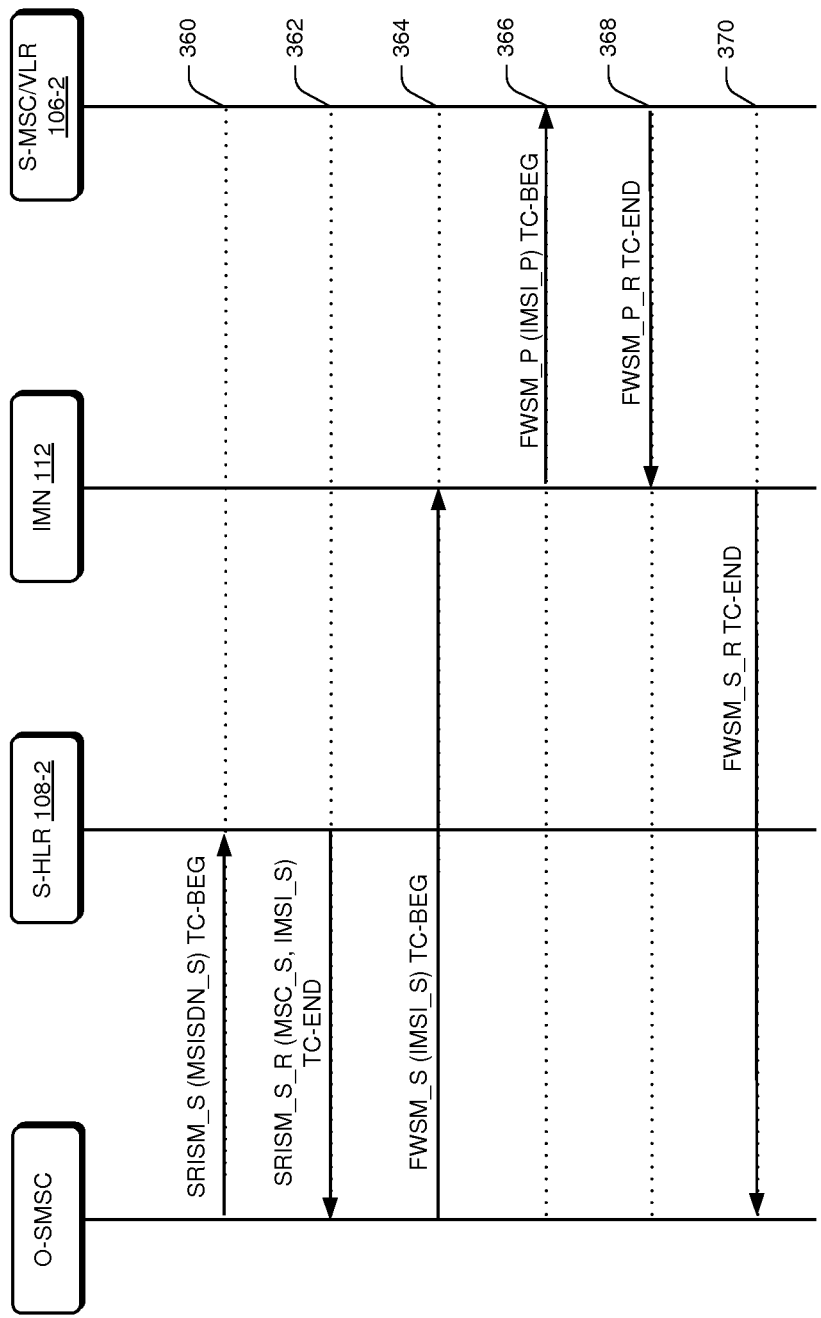

FIGS. 3(a), 3(b), and 3(c) illustrates call-flow diagrams indicating procedures of providing mobile connectivity to users while roaming, in accordance with an embodiment of the present subject matter. The various arrow indicators used in the call-flow diagram depict the transfer of information between the S-MSC/VLR 106-2, the IMN 112, the D-HLR 108-1, and the S-HLR 108-2. In many cases, multiple network entities besides those shown may lie between the entities, including transmitting stations, and switching stations, although those have been omitted for clarity. Similarly, various acknowledgement and confirmation network responses may also be omitted for clarity.

The different components of the S-MSC/VLR 106-2, the IMN 112, and the network entity 201, as shown in FIG. 2 have been described with reference to the call flow represented in FIGS. 3(*a*), 3(*b*), and 3(*c*), however it would be understood that the S-MSC/VLR 106-2, the IMN 112, and the network entity 201 may be implemented in a different manner, without digressing from the scope and spirit of the present subject matter. Although the description of FIGS. 3(*a*), 3(*b*), and 3(*c*) is in reference with entities as shown in FIG. 2, several other entities of a communication network have also been described in reference to the 3(*a*), 3(*b*), and 3(*c*); and would be appreciated by those skilled in the art. Also, the description of FIGS. 3(*a*), 3(*b*), and 3(*c*) has been provided with respect to a GSM network, it will be understood the dynamic switching of service providers may be implemented for other networks as well, for example, CDMA network.

FIG. 3(*a*) represents a call flow of location update procedure for providing mobile connectivity to users while roaming, according to an implementation of the present subject matter. In one implementation, the call flow of location update procedure has been explained in reference to the S-MSC/VLR 106-2, IMN 112, D-HLR 108-1, and the S-HLR 108-2. In said implementation, upon identifying a user utilizing IR and latched onto the communication network, the S-MSC/VLR 106-2 may initiate a location update procedure. At step 300, the S-MSC/VLR 106-2 may send a LU_I (IMSI_P) TC-BEG message to the IMN 112. As described before, the S-MSC/VLR 106-2 may include all the IMSI numbers for which the location update message would be sent to the IMN 112 instead of the default HLR associated with the IMSI number. In one implementation, such IMSI numbers may be provided to the S-MSC/VLR 106-2 by different service providers who have allocated a secondary MSISDN and a secondary IMSI number to their users. The location update message sent at step 300 may include the primary IMSI number of the user, i.e., the IMSI_P.

As described before, in one implementation of the present subject matter, the IMN 112 may generate a dummy location update message similar to the location update message received at the step 300. In said implementation, a LU_P_I (IMSI_P) TC-BEG message, i.e., the original location update message received by the IMN 112 may be sent to the default HLR of the user, such as the D-HLR 108-1 at step 302. Similarly, at step 304, a LU_S_I (IMSI_S) TC-BEG, i.e., the dummy location update message may be sent by the IMN 112 to the secondary HLR, such the S-HLR 108-2. The dummy location update message sent at the step 304 may include the secondary IMSI number IMSI_S instead of the primary IMSI number. Further, the dummy location update message may also include the address of IMN 112 as the serving MSC and VLR instead of the address of the S-MSC/VLR 106-2.

At step 306, the D-HLR 108-1 may also send a ISD_P_ITC-CON message, i.e., an initiation ISD message corresponding to the profile of the user to the IMN 112. Further, the IMN 112 may send an ISD_P_RTC-CON message as a response to the ISD message at step 308 to the D-HLR 108-1. It would be appreciated that the exchange of messages between the IMN 112 and the D-HLR 108-1 is based on the primary IMSI number IMSI_P. Upon exchange of ISD messages between the IMN 112 and the D-HLR 108-1, the D-HLR 108-1 may send a LU_P_RTC-END as an END message to the IMN 112 confirming the completion of the location update procedure at step 310.

In another implementation, at step 312, the S-HLR 108-2 may also send an ISD_S_TC-CON as an ISD message in response to the dummy location update message received at step 304. The exchange of ISD messages between the D-HLR 108-2 and the IMN 112 may be based on the secondary IMSI number (IMSI_S) allocated to the user. For exchange of the ISD messages between the S-HLR 108-2, the IMN 112 may act as a facilitator where the ISD messages sent by the S-HLR 108-2 are forwarded to the S-MSC/VLR 106-2 by the IMN 112 and vice versa. Hence, the IMN 112 may forward the ISD message received from the S-HLR 108-2 to the S-MSC/VLR 106-2 at step 314. Similarly, the response of the S-MSC/VLR 106-2 sent at step 316 may be forwarded to the S-HLR 108-2 at step 318. Finally, the IMN may also forward the location update completion message sent by the S-HLR 108-2 at step 320 to the S-MSC/VLR 106-2 at step 322.

FIG. 3(*b*) represents a call flow of MT call for a user on secondary MSISDN while the user is roaming, according to an implementation of the present subject matter. In one implementation, the call flow of location update procedure has been explained in reference to a Gateway MSC (G-MSC) of the secondary service provider, referred to as S-G-MSC hereinafter, the IMN 112, the S-HLR 108-2, and the S-MSC/VLR 106-2.

In one implementation, the user utilizing communication services in the roaming nation through the secondary service provider may receive a MT call on the secondary MSISDN allocated to him. It would be understood that since the secondary MSISDN is associated with the secondary service provider, the MT call would be directed to the gateway MSC of the secondary service provider, such as the S-G-MSC. In said implementation, the MT call request for the user is received by the S-G-MSC at step 330. The MT call request may include the secondary MSISDN (MSISDN_S) associated with the user, as indicated by the request of Initial Address Message (IAM)-IAM (MSISDN_S). Upon receiving the IAM request, the S-G-MSC may generate a MAP message for the S-HLR 108-2, such as the S-HLR 108-2 associated with the secondary MSISDN in the form of a SRI_S request. At step 332, a SRI_S (MSISDN_S) TC-BEG may be received by the S-HLR 108-2.

As described before, the S-HLR 108-2 of the secondary service provider was sent a dummy location update message and therefore, the S-HLR 108-2 holds the address of the IMN 112 instead of the S-MSC/VLR 106-2 to which the user is latched to. Hence, the S-HLR 108-2 may send the MAP message in the form of a PRN_S to the IMN 112. Further, the IMN 112 may include the secondary IMSI number associated with the secondary MSISDN of the user in the MAP message. Hence, at step 334 a PRN_S (IMSI_S) TC-BEG MAP message may be sent to the IMN 112.

In one implementation, the IMN 112 may map the secondary IMSI number in the MAP message to the primary IMSI number before forwarding the request to the MSC/VLR to which the user is latched to. At step 336, the IMN may send the MAP message PRN_P (IMSI_P) TC-BEG to the S-MSC/VLR 106-2. In said implementation, the MAP message PRN_P (IMSI_P) TC-BEG would include the primary IMSI number based on which, the S-MSC/VLR 106-2 may establish a connection with the communication device 102 of the user. It would be understood by those skilled in the art that the mapping of the secondary IMSI number to the primary IMSI number by the IMN 112 is done since the user is utilizing a SIM including the primary IMSI number. Therefore, for the S-MSC/VLR 106-2 to establish a connection with the user, the request is communicated based on the primary IMSI number of the user.

The S-MSC/VLR 106-2 may send a response to the PRN request received at the step 336. In one implementation, the response may include a dynamically generated Mobile Station Roaming Number (MSRN) in the format PRN_P_R (MSRN_S) TC-END sent by the S-MSC/VLR 106-2 at step 338. The IMN 112 may forward the response to the S-HLR 108-2 upon saving the MSRN for further user at step 340. The S-HLR 108-2 may again save the MSRN for further use and forward the response to the S-G-MSC at step 342. Further, the S-G-MSC may also save the MSRN and send the same to the called party with the MSRN along with the IAM response, such as the IAM (Called MSRN) at step 344. Upon completion of the above described procedure, the MT call for the user may directly be routed to the user.

FIG. 3(*c*) represents a call flow of MT SMS call for a user on secondary MSISDN while the user is roaming, according to an implementation of the present subject matter. In one implementation, the call flow of location update procedure has been explained in reference to a Short Message Service Center (SMSC) of the service provider serving the SMS originating party, referred to as O-SMSC hereinafter, the IMN 112, the S-HLR 108-2, and the S-MSC/VLR 106-2.

In one implementation of the present subject matter, when there is a terminating SMS attempt on the secondary MSISDN of the user, the O-SMSC of the originating party may contact the HLR associated with the secondary MSISDN of the user, such as the S-HLR 108-2. At step 360, the O-SMSC may send a SRISM_S (MSISDN_S) TC-BEG message to the S-HLR 108-2. Upon receiving such message at step 360 from the O-SMSC, the S-HLR 108-2 may send the O-SMSC the secondary IMSI number associated with the secondary MSISDN and the address of the MSC/VLR to which the user is currently latched to. Since, during the location update procedure, the S-HLR 108-2 received the dummy location update message, the address of the MSC/VLR to which the user is latched to is the address of the IMN 112. Hence, the S-HLR 108-2 may send a SRISM_S_R (MSC_S, IMSI_S) TC-END response to the O-SMSC at step 362 that may include the secondary IMSI number of the user and the address of the IMN 112 as MSC_S address.

Based on the response received at the step 362, the O-SMSC may save the MSC/VLR address and the IMSI number. These details may be utilized by the O-SMSC in 'SM RP DA' parameters of a FWSM message to be sent to the address received, i.e., to the IMN 112. At step 364, the O-SMSC may send a FWSM_S (IMSI_S) TC-BEG message to the IMN 112. The IMN 112 may receive such message for the user along with the secondary IMSI number and may map this received secondary IMSI number to a corresponding associated primary IMSI number. Upon identification of the primary IMSI number corresponding to the received secondary IMSI number, at step 366, the IMN 112 may send a FWSM_P (IMSI_P) TC-BEG message to the S-MSC/VLR 106-2 to which the user is latched to. The message may include the primary IMSI number associated with the user, as indicated by the IMSI_P parameter of the request.

At step 368, the S-MSC/VLR 106-2 may send a response to the message received at the step 366 in the form of FWSM_P_R TC-END. The IMN 112 may replace the parameters associated with the primary IMSI number and the primary MSISDN in the response with the secondary IMSI number and the secondary MSISDN details and forward the response to the O-SMSC at step 370 in the form of FWSM_S_R TC-END.

It may so happen that the user utilizing primary and secondary IMSI number, and primary and secondary MSISDN; may receive a MT-SMS via SGSN on the secondary MSISDN. In such situations, according to an implementation of the present subject matter, the procedure followed may be similar to the call flow explained in FIG. 3(*c*) where instead of the S-MSC/VLR 106-2, the IMN may contact the SGSN associated with the user. It would be appreciated by those skilled in the art that at steps 366 and 368, the entities involved may be IMN 112 and SGSN instead of the IMN 112 and the S-MSC/VLR 106-2. Since the rest of the call flow may remain the same, the details of the same have been omitted for the sake of brevity.

Figure 4A:
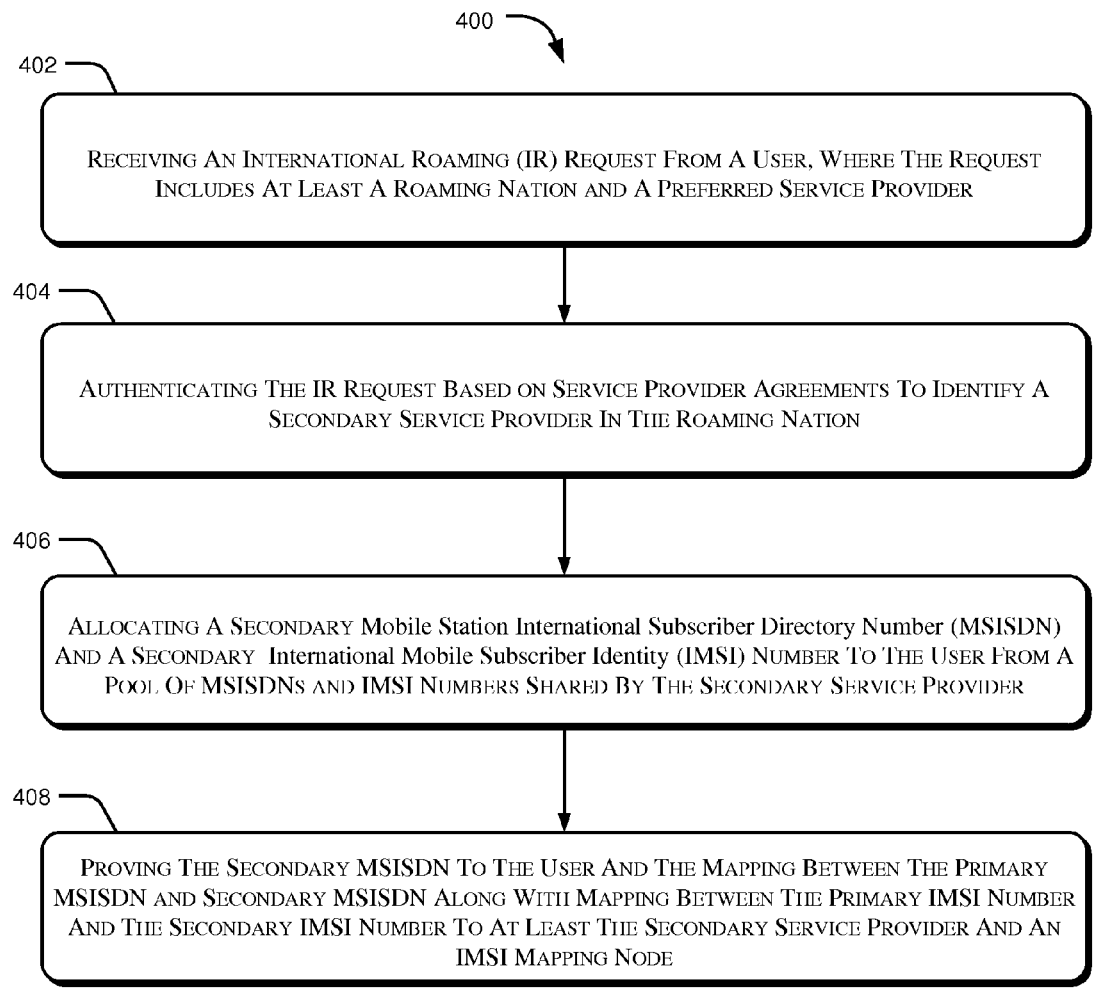
FIGS. 4(a), 4(b), and 4(c) illustrate methods to provide mobile connectivity, in accordance with an embodiment of the present subject matter.
Figure 4B:
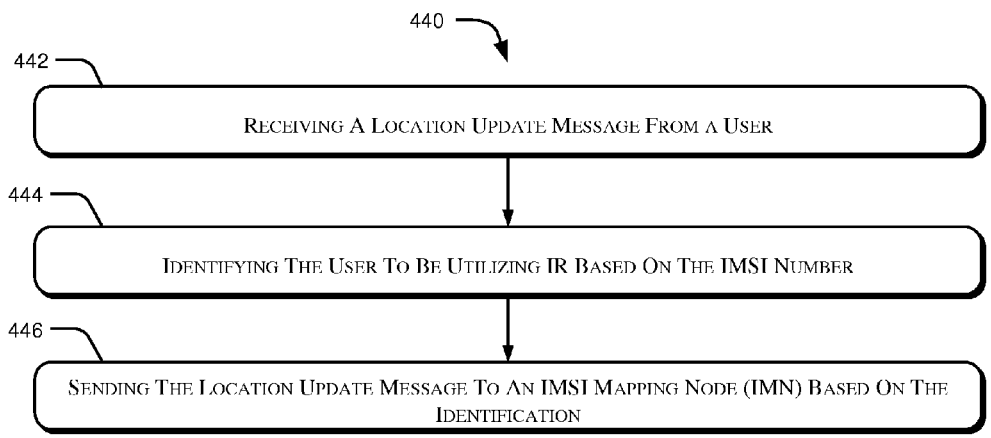
Figure 4C:
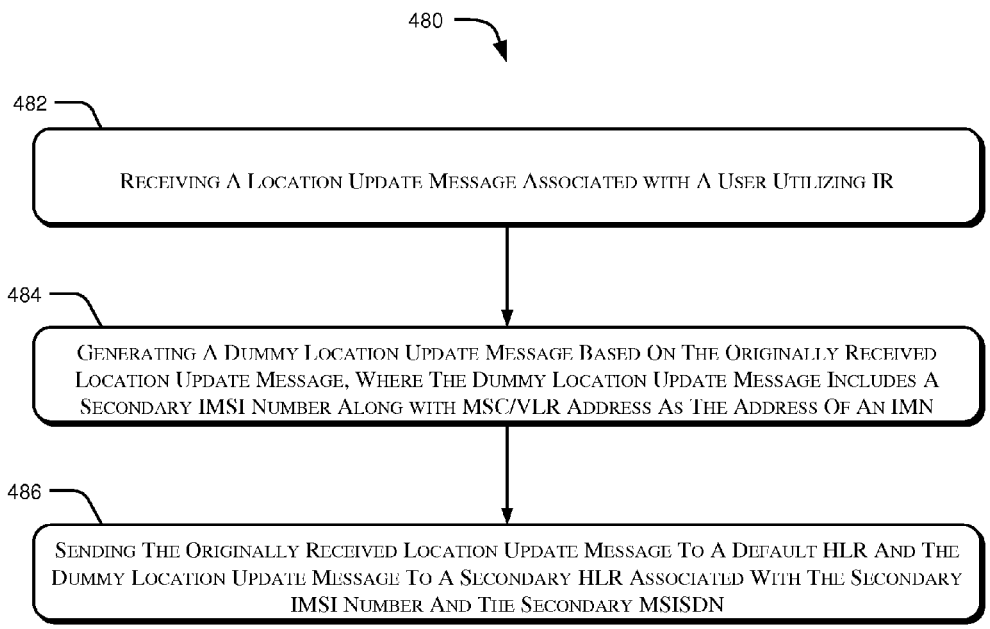

FIGS. 4(*a*), 4(*b*), and 4(*c*) illustrates methods 400, 440, and 480 for providing mobile connectivity in a communication network to users on roaming, according to an embodiment of the present subject matter. The order in which the methods are described is not intended to be construed as a limitation, and any number of the described method blocks can be combined in any order to implement the methods 400, 440, and 480, or any alternative methods. Additionally, individual blocks may be deleted from the methods without departing from the spirit and scope of the subject matter described herein. Furthermore, the methods can be implemented in any suitable hardware, software, firmware, or combination thereof.

The method(s) may be described in the general context of computer executable instructions. Generally, computer executable instructions can include routines, programs, objects, components, data structures, procedures, modules, functions, etc., that perform particular functions or implement particular abstract data types. The method may also be practiced in a distributed computing environment where functions are performed by remote processing devices that are linked through a communications network. In a distributed computing environment, computer executable instructions may be located in both local and remote computer storage media, including memory storage devices.

A person skilled in the art will readily recognize that steps of the methods can be performed by programmed computers. Herein, some embodiments are also intended to cover program storage devices, for example, digital data storage media, which are machine or computer readable and encode machine-executable or computer-executable programs of instructions, where said instructions perform some or all of the steps of the described method. The program storage devices may be, for example, digital memories, magnetic storage media, such as a magnetic disks and magnetic tapes, hard drives, or optically readable digital data storage media. The embodiments are also intended to cover both communication network and communication devices configured to perform said steps of the exemplary methods.

Referring to FIG. 4(*a*), the method 400 may be implemented by entities of the default service provider, such as the network entity 201. At block 402, an international roaming (IR) request from a user may be received, where the request includes at least a roaming nation and a preferred service provider. In one implementation of the present subject matter, the user sending the request may specify more than one preferred service provider in the desired roaming nation. Further, the network entity 201 may receive such requests through different modes, such as, through USSD requests, and IVR systems.

At block 404, the request for the IR may be authenticated based on service provider agreements to identify a secondary service provider in the roaming nation. In one implementation, the user may have specified more than one preferred service provider. In such a scenario, a service provider for which an agreement exists, may be chosen as the secondary service provider for the user in the roaming nation. Further, in case the agreement exists for two or more service providers, any service provider may be chosen randomly.

At block 406, a secondary Mobile Station International Subscriber Directory Number (MSISDN) and a secondary International Mobile Subscriber Identity (IMSI) number may be allocated to the user from a pool of MSISDNs and IMSI numbers shared by the secondary service provider. In one implementation, the service providers that have an agreement to provide IR may share a pool of MSISDNs and IMSI numbers with each other. In said implementation, the user requesting for IR may be allocated a secondary MSISDN and a secondary IMSI number from the pool of the identified secondary service provider.

At block 408, the secondary MSISDN may be provided to the user. Further, the mapping between the primary MSISDN and the secondary MSISDN along with mapping between the primary IMSI number and the secondary IMSI number to at least the secondary service provider and an IMSI Mapping Node (IMN), such as the IMN 112. In one implementation, the primary IMSI number of the user to which the allocation has been done may also be provided to the MSC/VLRs of the secondary service provider. It would be understood that the secondary MSISDN and the secondary IMSI number from the shared pool may be associated with the secondary service provider where the range of both, the MSISDN and the IMSI number resides with the secondary service provider.

Referring to FIG. 4(*b*), the method 440 may be implemented by entities of the secondary service provider, such as the S-MSC/VLR 106-2. In one implementation, at block 442, a location update message may be received from a user. The user may be in a roaming nation and utilizing IR along with a secondary MSISDN and a secondary IMSI number. It would be understood by those skilled in the art that the location update message send by the user would be based on the primary IMSI number associated with a SIM card utilized by the user.

At block 444, the user is identified to be utilizing IR based on the IMSI number received in the location update message. In one implementation, the S-MSC/VLR 106-2 of the secondary service provider may receive the location update message and may identify the user to be utilizing the IR based on the IMSI number.

At block 446, the received location update message may be sent to an IMN. In one implementation, the location update message is sent to the IMN for those users whom IMSI number is available with the S-MSC/VLR 106-2. As described before, the S-MSC/VLR 106-2 may receive a list of such IMSI numbers from different service providers who are in agreement with the secondary service provider to which the user is currently latched to.

Referring to FIG. 4(*c*), the method 480 may be implemented by the IMN 112. In one implementation, at block 482, a location update message associated with a user utilizing IR may be received. The location update message may include the primary IMSI number of the user associated with the SIM utilized by the user.

At block 484, a dummy location update message based on the originally received location update message may be generated. In one implementation, the IMN 112 may generate the dummy location update message where the dummy location update message may include a secondary IMSI number along with MSC/VLR address as the address of the IMN 112 itself.

As described before, the secondary IMSI number associated with the primary IMSI number of the user is received by the IMN from the default service provider of the user.

At block 486, the originally received location update message may be sent to a default HLR associated with the user. In one implementation, the IMN 112 may identify the default HLR associated with the user based on the primary IMSI number and the primary MSISDN of the user. Further, the dummy location update message may be sent to a secondary HLR associated with the secondary IMSI number and the secondary MSISDN.

Although embodiments for methods and systems for providing mobile connectivity to users while roaming in a communication network have been described in a language specific to structural features and/or methods, it is to be understood that the invention is not necessarily limited to the specific features or methods described. Rather, the specific features and methods are disclosed as exemplary embodiments for providing mobile connectivity to users while roaming in the communication network.

We claim:

1. A method to provide mobile connectivity in a communication network, the method comprising:
receiving a location update message associated with a user latched to a secondary service provider, the user having a subscriber identity module (SIM) with a primary International Mobile Subscriber Identity (IMSI) number provided by a default service provider of the user, wherein the location update message is based on the primary IMSI number of the user and comprises address details of a Visiting Location Register (VLR) of the secondary service provider;
generating a dummy location update message based on the received location update message and a secondary IMSI number associated with the secondary service provider, wherein the secondary IMSI number corresponds to the primary IMSI number of the user, and wherein the dummy location update message comprises address details of a Visiting Location Register (VLR) of the secondary service provider substituted with address details of an IMSI Mapping Node (IMN); and
sending the dummy location update message to the secondary service provider associated with the secondary IMSI number to provide the user communication services by the secondary service provider based on the primary IMSI number.

2. The method as claimed in claim 1, wherein the user is allocated the secondary IMSI number and an associated secondary Mobile Station International Subscriber Directory Number (MSISDN) based on service level agreement (SLA) parameters associated with the default service provider and the secondary service provider.

3. The method as claimed in claim 1, wherein the sending comprises:
providing the dummy location update message to a secondary-home location register (S-HLR) of the secondary service provider; and
forwarding the received location update message to a D-HLR of the default service provider.

4. The method as claimed in claim 3, the method further comprising:
receiving a response message from the S-HLR based on the dummy location update message, wherein the response message is based on the secondary IMSI number; and
sending the response message to the VLR, wherein the response message provides details of a secondary profile associated with the user based on the secondary IMSI number and the secondary MSISDN, and wherein the secondary profile associates the secondary MSISDN of the user with the primary IMSI number in the VLR.

5. The method as claimed in claim 1, wherein the method further comprises:
receiving an insert subscriber data (ISD) message from the default service provider of the user based on the sent location update message, wherein the ISD message comprises details of a primary profile of the user associated with the primary MSISDN and the primary IMSI number; and
sending a response to the default service provider, upon receiving the ISD message.

6. An IMSI mapping node (IMN) comprising:
a processor;
a memory coupled to the processor, the memory comprising:
  a request processing module configured to receive a location update message, associated with a user latched to a secondary service provider, the user having a SIM with a primary IMSI number provided by a default service provider of the user, wherein the location update message is based on the primary IMSI number of the user and comprises address details of a Visiting Location Register (VLR) of the secondary service provider; and
  a configuration module configured to:
    generate a dummy location update message based on the location update message and a secondary IMSI number associated with the secondary service provider, wherein the secondary IMSI number corresponds to the primary IMSI number of the user; and
    send the dummy location update message to a S-HLR of the secondary service provider associated with the secondary IMSI number such that the user is provided communication services by the secondary service provider based on the primary IMSI.

7. The IMN as claimed in claim 6, wherein the configuration module is further configured to send the location update message to a D-HLR of the default service provider.

8. The IMN as claimed in claim 6, wherein the request processing module is further configured to:
receive a response message from the S-HLR based on the dummy location update message, wherein the response message is based on the secondary IMSI number; and
send the response message to a VLR of the secondary service provider to which the user is latched to, wherein the response message provides details of a secondary profile associated with the user based on the secondary IMSI number and the secondary MSISDN, and wherein the secondary profile associates the secondary MSISDN of the user with the primary IMSI number in the VLR.

9. The IMN as claimed in claim 8, wherein the configuration module is configured to map the secondary IMSI number and the secondary MSISDN, with a primary MSISDN and a primary IMSI number associated with the user.

10. A non-transitory computer-readable medium having embodied thereon a computer readable program code for executing a method comprising:
receiving a location update message, associated with a user latched to a secondary service provider, the user having a SIM with a primary IMSI number provided by a default service provider of the user, wherein the location update message is based on the primary IMSI number of the user and comprises address details of a Visiting Location Register (VLR) of the secondary service provider;
generating a dummy location update message based on the received location update message and a secondary IMSI number associated with the secondary service provider, wherein the secondary IMSI number corresponds to the primary IMSI number of the user; and
sending the dummy location update message to the secondary service provider associated with the secondary IMSI number such that the user is provided communication services by the secondary service provider based on the primary IMSI.

* * * * *